July 24, 1928.
C. KOTCHI ET AL
1,678,148
APPARATUS FOR PRODUCING RODS FOR WELDING
Filed Nov. 24, 1924    2 Sheets-Sheet 2
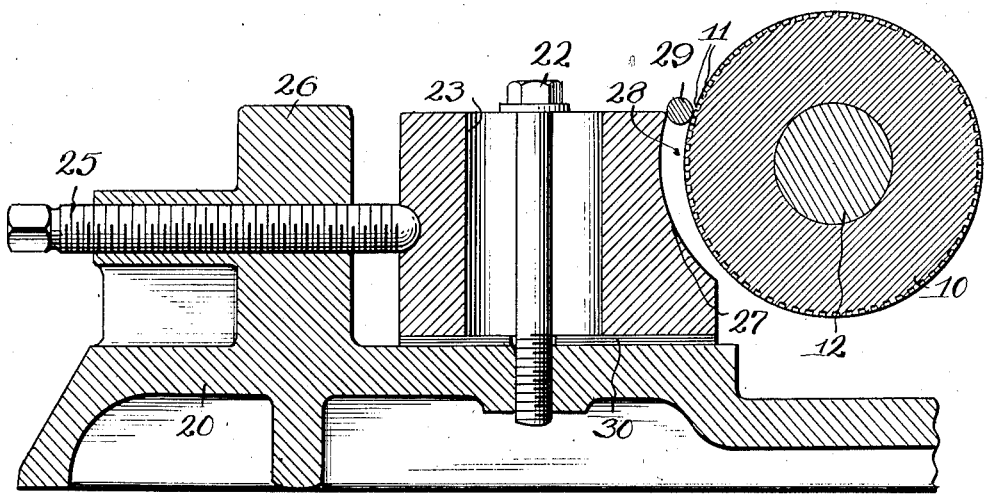
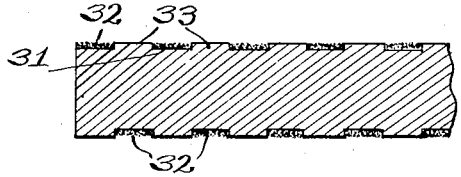
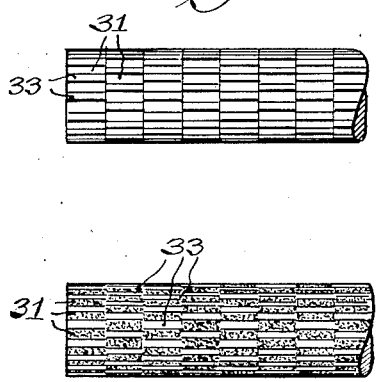

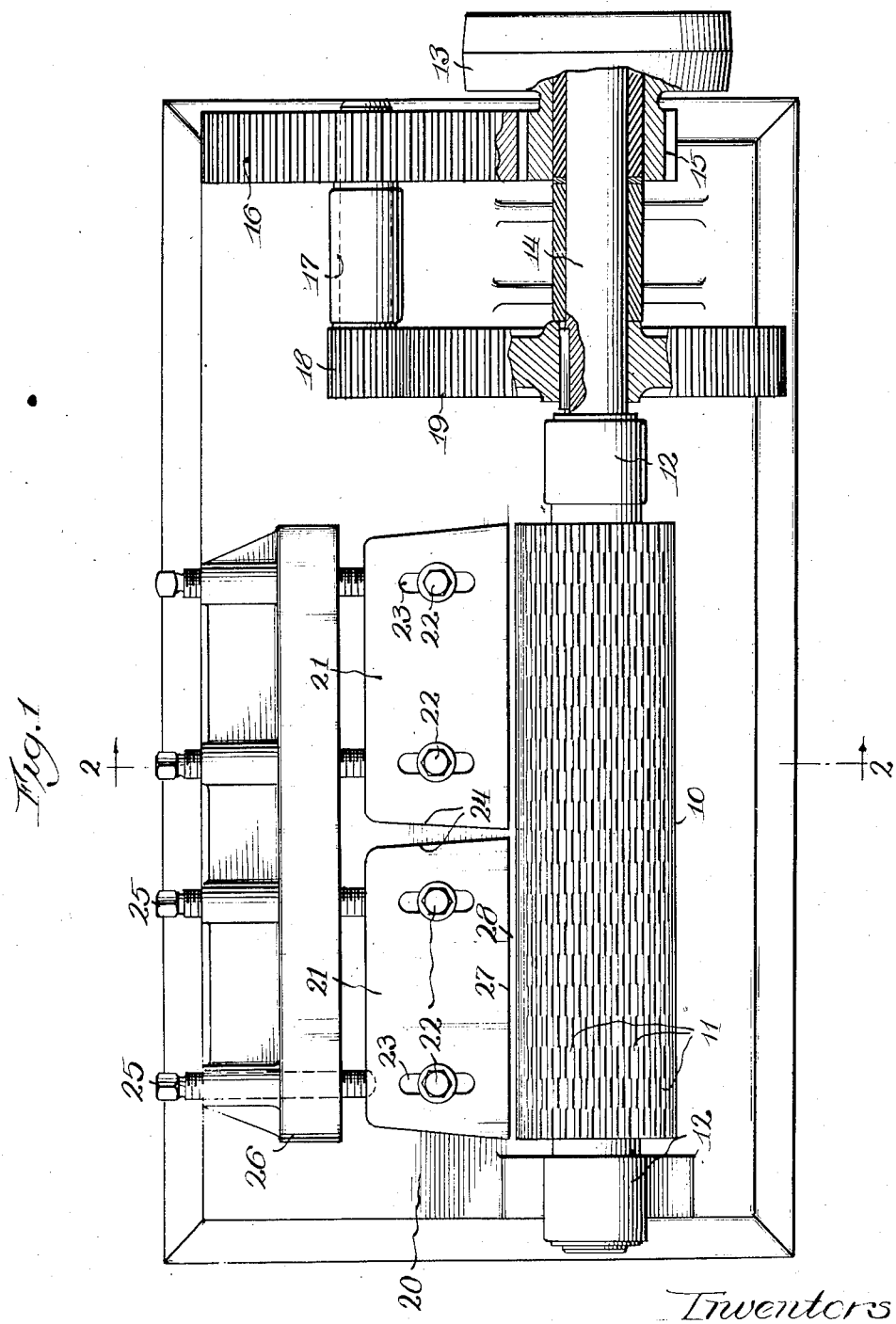

Patented July 24, 1928.

1,678,148

UNITED STATES PATENT OFFICE.

CHARLES KOTCHI, OF BAY CITY, MICHIGAN, AND FREDRICH J. RODE, OF CHICAGO, ILLINOIS, ASSIGNORS, BY MESNE ASSIGNMENTS, TO KORO CORPORATION, OF WAUKEGAN, ILLINOIS, A CORPORATION OF ILLINOIS.

APPARATUS FOR PRODUCING RODS FOR WELDING.

Application filed November 24, 1924. Serial No. 752,040.

This invention relates to an improved method of producing rods for welding of the type which is fused by applied heat, the molten metal of the electrode being deposited upon and united with the parts to be welded, and which electrode is of a construction embodying a metallic core in the form of a rod, the surface of the electrode being provided with recesses, grooves, indentations, cavities or pockets and the like, for receiving and retaining a filling or covering, which latter serves as a protecting covering for the surfaces of the electrode contacted by the covering, portions of the surface of the electrode throughout its length and about its periphery being exposed and free from such covering.

The exposed portions of the surface of the body of the rod renders it possible, in electric welding to connect or transmit the current to the electrode at various points throughout the length of the electrode, the covering being of any suitable material which will burn or char under the flame of the arc and crumble or fall away in particles as the rod or electrode fuses or is consumed, and serves as a flux in the welding operation.

To the attainment of these ends and the accomplishment of other new and useful objects as will appear, the invention consists in substantially the improved method hereinafter described and claimed and in the features of novelty in substantially the construction, combination and arrangement of the several parts of the apparatus hereinafter more fully described and claimed for carrying this invention into operation and as diagrammatically illustrated in the accompanying drawing, and in which drawing Figure 1 is a top plan view of an apparatus by means of the use of which this improved method may be carried into operation.

Figure 2 is a detail sectional view taken on line 2—2, Figure 1.

Figure 3 is a plan view of a portion of one form of electrode formed in accordance with the principles of this invention and with the covering omitted.

Figure 4 is a view similar to Figure 3 of a portion of a completed rod.

Figure 5 is a sectional view of a completed rod.

Throughout the specification and claims the term "cavity" will be employed to designate the space or opening which receives and retains the covering material, but it is to be understood that this is not a term of limitation, but is to be construed broadly to include any form of opening, groove, depression, knurling, serrations, pocket or the like, which is formed in the electrode opening through the periphery thereof and into which the covering material is placed.

Referring more particularly to the drawing the numeral 10 designates a roller preferably of a drumlike configuration, the surface of which is shaped according to the product which it is desired to produce, that is in the present exemplification of the invention the roller is provided with a plurality of recesses 11 arranged about its circumference and throughout the length thereof.

This roller is mounted upon a suitable support 12 and is driven in any suitable manner, preferably from a pulley 13 mounted upon a shaft 14 of the roller. A gear 15 is connected with the pulley 13 and mounted loosely upon the shaft 14 and meshes with a gear 16 connected with a shaft 17, and to which shaft 17 is connected another gear 18, which in turn meshes with a gear 19 secured to the shaft 14.

Mounted upon a suitable support 20 is a member which co-operates with the roller 10 and this member preferably comprises sections 21 arranged end to end and extending lengthwise of the roller. The sections 21 are adjustably mounted upon the support 20 by means of suitable fastening devices such as bolts 22 passing through slots 23 and the proximate faces of the sections 21 are preferably beveled or cut away as at 24 so as to permit one of the sections 21 to be adjusted in directions toward and away from the axis of the roller 10, independently one with respect to the other to compensate any irregularity in the shape of the material being operated upon.

This is accomplished by reason of the fact that the proximate ends of adjacent sections may be set closer to the roller 10 than the outer ends of the same sections, with the result that when the rod is placed in position in the machine the material will be squeezed outwardly so that it will flow towards the ends of the rod and the rod will be squeezed outwardly and straightened.

The adjustment of these sections 21 may be accomplished in any suitable manner such as by means of adjusting bolts 25 which pass through a suitable fixed portion 26 of the apparatus.

The surface 27 of each of the sections 21 is constructed on a radius described from the center of the axis of the roller 10, and the sections 21 are spaced from the roller 10 so as to form a space 28 therebetween and into which space the material 29 to be operated upon, is fed.

The sections 21 are also adapted to be vertically raised or shifted so as to move the surface 27 thereof with respect to the periphery of the roller 10 and the axis of the roller so that the surface 27 will be eccentrically disposed with respect to the surface of the roller 10, so that the space 28 between the two will gradually decrease in width from the entrance to the exit end of the space. This shape of space is provided in order to gradually increase the pressure of the roller upon the article 29 as it is being fed through the space, causing the article to be rotated about its own axis while it is being thus shaped. This surface 27 together with the periphery of the roller are hardened in any suitable manner to prevent wear.

The vertical adjustment of the sections 21 may be accomplished in any suitable manner such as by means of the use of shims 30 placed under the respective sections to raise them to any desired extent.

In operation the roller being rotated, the stock 29 is fed into the space 28 and is moved downwardly through the space by the roller 10. During this advancing movement of the stock 29 friction will be created between the roller and the stock, which will cause the stock to rotate about its own axis, and during this rotation the walls of the recesses or cavities in the periphery of the roller 10 will form indentations or cavities about the periphery of the stock, the increased pressure exerted upon the stock 29 as it moves through the space 28, serving as a means for constantly rotating the stock while it is being operated upon.

After the stock has passed from the machine it will be formed with a plurality of cavities 31 about its periphery and throughout the length of the rod. Covering material 32 is then placed within the cavities 31 in any suitable manner, and when the rod is completed there will be provided a rod having portions throughout its length and about its periphery, covered and protected by the covering 32, while the portions 33 of the rod will be uncovered and exposed so as to render it possible to connect or transmit the current to the rod at various points throughout the length of the rod.

While one form of rod has been herein shown and described, it is to be understood that various other forms may be thus constructed, and while the preferred form of apparatus for carrying this invention into operation has also been shown and described, and as any other form of apparatus suitable for the purpose may be employed, it is desired that the drawing of the apparatus submitted herewith shall be considered as being merely diagrammatic.

What is claimed as new is:—

1. An apparatus for use in producing by a pressing operation a rod for welding having cavities opening into its body, said apparatus including an extended cavity producing roller, a surface co-operating with the roller and spaced therefrom and between which roller and surface the rod is rolled, the said surface being formed in independent sections, said sections being arranged end to end lengthwise of the roller, means for adjusting said sections independently one with respect to the other and in directions towards and away from the axis of the roller, whereby the proximate ends of adjacent sections may be placed closer to the surface of the roller than the remaining portion of the respective sections, and means for rotating the roller.

2. An apparatus for use in producing by a pressing operation a rod for welding having cavities opening through its body, said apparatus including an elongated cavity producing roller, a surface co-operating with the roller and spaced therefrom and between which roller and surface the rod is rolled, the said surface being formed in independent sections, said sections being arranged end to end and lengthwise of the roller, means for adjusting the said sections independently one with respect to the other and in directions toward and away from the axis of the roller, the proximate ends of said sections operating to create a greater pressure upon the work to squeeze the material in the work towards the ends of the work, and means for rotating the roller, the periphery of the roller and the surface of the said sections which co-operate therewith being eccentric one with relation to the other.

3. An apparatus for use in producing by a pressing operation a rod for welding, said apparatus including an extended roller, a surface co-operating with the roller and spaced therefrom and between which roller and surface the rod is rolled, the said surface being formed in independent sections arranged lengthwise of the roller and end to end, means for adjusting said sections independently one with respect to the other in directions toward and away from the axis of the roller, the proximate ends of adjacent sections exerting a greater pressure upon the rod than the remaining portions of the sections to squeeze the material in the rod to cause the metal to flow outwardly toward the ends of the rod, and means for rotating the roller.

In testimony whereof we have signed our names to this specification, on this 14th day of November, A. D. 1924.

CHARLES KOTCHI.
FREDRICH J. RODE.